(12) United States Patent
Hughes et al.

(10) Patent No.: US 11,687,636 B1
(45) Date of Patent: *Jun. 27, 2023

(54) PUPIL DILATION RESPONSE FOR AUTHENTICATION

(71) Applicant: WELLS FARGO BANK, N.A., San Francisco, CA (US)

(72) Inventors: Noah L. Hughes, Des Moines, IA (US); John Ervin Eisenhauer, Sandpoint, ID (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,401

(22) Filed: Sep. 17, 2021

Related U.S. Application Data

(63) Continuation of application No. 16/886,275, filed on May 28, 2020, now Pat. No. 11,138,305, which is a continuation of application No. 15/826,962, filed on Nov. 30, 2017, now Pat. No. 10,685,101.

(51) Int. Cl.
| | |
|---|---|
| *G06F 21/32* | (2013.01) |
| *G06F 21/36* | (2013.01) |
| *G06V 40/19* | (2022.01) |
| *G06V 40/50* | (2022.01) |
| *G06V 40/18* | (2022.01) |

(52) U.S. Cl.
CPC ............ *G06F 21/32* (2013.01); *G06F 21/36* (2013.01); *G06V 40/19* (2022.01); *G06V 40/193* (2022.01); *G06V 40/197* (2022.01); *G06V 40/50* (2022.01)

(58) Field of Classification Search
CPC ......... G06F 21/32; G06F 21/36; G06V 40/19; G06V 40/193; G06V 40/197; G06V 40/50
See application file for complete search history.

(56) References Cited

U.S. PATENT DOCUMENTS

| | | |
|---|---|---|
| 6,247,813 B1 | 6/2001 | Kim et al. |
| 7,614,745 B2 | 11/2009 | Waldorf et al. |
| (Continued) | | |

FOREIGN PATENT DOCUMENTS

| | | |
|---|---|---|
| WO | 2015122789 | 8/2015 |
| WO | 2016111875 | 7/2016 |
| WO | 2017075572 | 5/2017 |

OTHER PUBLICATIONS

Kumar et al., Comparison and Combination of Iris Matchers for Reliable Personal Authentication, Pattern Recognition, vol. 43, No. 3, Mar. 2010, pp. 1016-1026.

*Primary Examiner* — Abiy Getachew
(74) *Attorney, Agent, or Firm* — Kilpatrick Townsend & Stockton LLP

(57) ABSTRACT

A user's emotion can be determined based on pupil dilation response to a challenge prompt. In response to an authentication request, a registered challenge prompt and an expected pupil dilation response can be retrieved. The challenge prompt can include one or more images or a video designed to cause a pupil dilation response in a user. The challenge prompt is displayed to the user and the user's pupil dilation response is captured. At least one user action of the user is monitored and an emotion is determined based on the at least one user action. The emotion is associated with the pupil dilation response.

18 Claims, 8 Drawing Sheets

(56) References Cited

U.S. PATENT DOCUMENTS

| | | | |
|---|---|---|---|
| 8,548,209 B2 * | 10/2013 | Lung | G06V 40/19 382/104 |
| 9,367,677 B1 | 6/2016 | Adhami et al. | |
| 9,466,068 B2 | 10/2016 | Raichelgauz et al. | |
| 10,685,101 B1 | 6/2020 | Hughes et al. | |
| 2008/0253622 A1 | 10/2008 | Tosa et al. | |
| 2009/0232357 A1 * | 9/2009 | Angell | G06V 20/52 382/103 |
| 2014/0333413 A1 * | 11/2014 | Kursun | G06V 40/70 382/117 |
| 2016/0266643 A1 | 9/2016 | Martensson et al. | |
| 2017/0091548 A1 * | 3/2017 | Agrawal | G06F 21/32 |
| 2017/0091550 A1 * | 3/2017 | Feng | G06T 7/0012 |
| 2017/0235918 A1 | 8/2017 | Hagen et al. | |
| 2017/0255766 A1 | 9/2017 | Kaehler | |

* cited by examiner

PUPIL DILATION RESPONSE FOR AUTHENTICATION

CROSS REFERENCE TO RELATED APPLICATIONS

This application is a continuation of U.S. patent application Ser. No. 16/886,275, filed May 28, 2020, which is a continuation of U.S. patent application Ser. No. 15/826,962, filed Nov. 30, 2017, now U.S. Pat. No. 10,685,101, the contents of which are incorporated herein by reference in their entirety.

BACKGROUND

Authenticating users is an important process for many businesses. Authentication is sometimes reliant on a simple username/password combination that must be memorized by the user and stored by an authenticating entity. Passwords are easily forgotten, guessed, or otherwise compromised. In some instance, more complex authentication protocols have been instituted, such as two-step authentication.

Most often in two-step authentication, the authenticating entity may require a physical device such as a mobile device, tablet, or dongle to effect authentication. Such devices can be misplaced, damaged, or simply unavailable. Similarly, oftentimes cellular service is unavailable thereby rendering two- or dual-factor authentication inoperable. Further, these additional devices may require expense by the user in terms of hardware, data plans or the like.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of authenticating users and registering users for pupil dilation response authentication. The registration can receive a registration request and generate a challenge prompt in response to the registration request. The authentication displays the challenge prompt to the user and records a first pupil dilation response of the user viewing the challenge prompt. The first pupil response is stored for future authentications. Authenticating the user can include receiving a second pupil dilation response and an authentication request from the user. The second pupil dilation response is compared to the first pupil dilation response. The user is authenticated based on the result of the comparison between the second pupil dilation response and the first pupil dilation response being substantially similar.

A system of the innovation can include a request component that receives a registration request and a generation component that generates a challenge prompt in response to the registration request. A display component displays the challenge prompt to the user. A recording component records a first pupil dilation response of the user viewing the challenge prompt and a profile component stores the first pupil dilation response of the user.

An authentication system of the innovation can include a user interface that records a first pupil dilation response and receives an authentication request from a user. The system can include a comparison component that compares the first pupil dilation response to a second pupil dilation response, where the second pupil dilation response of the user is previously recorded. An authentication component authenticates the user based on the result of the comparison between the second pupil dilation response and the first pupil dilation response being substantially similar.

In aspects, the subject innovation provides substantial benefits in terms of authentication and transactional security. One advantage resides in a more secure knowledge of the identity of a user. Another advantage resides in the lack of need for a password or physical device carried by a user.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
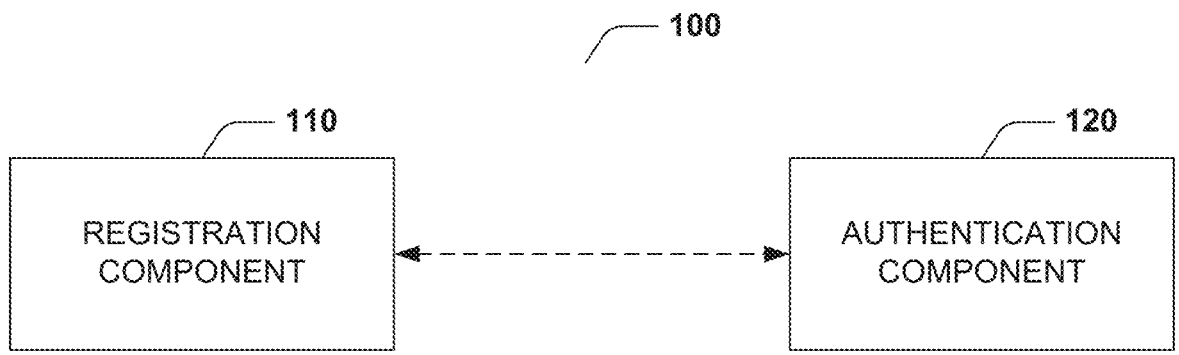
FIG. 1 illustrates an example component diagram of a pupil dilation system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates a pupil dilation system 100 for registering and authenticating a user using pupil dilation responses of the user. The pupil dilation system 100 includes a registration component 110 that registers a user to use pupil dilation responses as authentication credentials in the future. The registration component 110 receives a registration request from a user or a person assisting the user with registration such as a bank teller, customer service representative, and/or the like.

The registration component 110, in response to the registration request, initiates registration of the user. The registration component 110 generates a challenge prompt in response to the registration request. The challenge prompt is a series of images, a video, and/or the like that is designed to cause a pupil dilation response from the user when viewed by the user. In some embodiments, the registration component 110 can generate a randomized challenge prompt. In other embodiments, the registration component 110 can select from a set of pre-generated challenge prompts. In other embodiments, the registration component 110 receives a selection of a challenge prompt from the user. The challenge prompt changes resolution, color, brightness, focus, and/or the like to cause different pupil dilation responses from the user.

In some embodiments, the challenge prompt includes images that can induce an emotional response. The challenge prompt can select images associated with a particular emotion and associate a pupil dilation response with the emotional response. For example, the challenge prompt can include an image of a flag and associate the pupil dilation response with pride emotion.

The registration component 110 displays the challenge prompt to the user such that the user can provide a pupil dilation response to the challenge prompt. The registration component 110 records a pupil dilation response of the user viewing the challenge prompt. A pupil dilation response is how an individual user's pupils in their eyes react to viewing certain images or videos having different elements. For example, how a user's pupils react to a sudden change in brightness or resolution in a challenge prompt. When viewing the challenge prompt, the user's pupils react to many or multiple changes between the series of images that make up the challenge prompt. The multiple reactions are recorded in order to create the pupil dilation response.

The registration component 110 can collect image data such as a video of the pupil dilation response. The image data can focus on the eyes or general eye area of the user or can video the face. The image data captures the pupils in the video frame.

The pupil dilation response can be stored and processed by the registration component 110. The pupil dilation response is analyzed for pupil changes such as magnitude of dilation, speed of dilation, pattern of dilation and/or the like. The analysis, the pupil dilation response, and/or the challenge prompt can be stored and associated with a user profile for future authentications.

In some embodiments, the challenge prompt is shown to the user multiple times and the pupil dilation responses of the user are recorded for each instance the challenge prompt is shown. The pupil dilation responses can be aggregated or averaged to create a user pupil dilation response that has less anomalies and therefore is more predictable for use in future authentications.

The pupil dilation system 100 includes an authentication component 120. The authentication component 120 can receive an authentication request from the user. The user provides the authentication request using a user interface. The authentication component 120 can access the user profile from the registration component 110. The authentication component 120 receives the stored challenge prompt and the stored pupil dilation response of the user profile. In some embodiments, the authentication component 120 displays the challenge prompt to the user to cause a pupil dilation response. In other embodiments, the authentication component 120 can generate a second challenge prompt that will cause a similar pupil dilation response as the pupil dilation response associated with the user and stored with the registration component 110.

The authentication component 120 receives a second pupil dilation response from the user interface. The authentication component 120 compares the second pupil dilation response to the stored pupil dilation response. If the pupil dilation responses match, the authentication component 120 authenticates the user as the user associated with the user profile. If they do not match, the user is not authenticated. In some embodiments, the authentication component 120 includes an error factor when comparing the pupil dilation responses. In some embodiments, the authentication component 120 can correct for time of day, glasses, distance, ambient light, alcohol influence, and/or the like.

In some embodiments, the authentication component 120 can perform emotional analysis using the pupil dilation response. The authentication component 120 can associate the pupil dilation response with an emotion by analyzing the user interactions after authenticating using the pupil dilation response as described above. For example, a user authenticates at a financial institution using pupil dilation authentication. The user subsequently provides a customer complaint or closes an account. The authentication component 120 can associate the pupil dilation response provided during authentication with an anger or frustrated emotion.

The authentication component 120 can use emotion associations to detect the user emotions in a subsequent pupil dilation authentication by comparing and/or matching the current pupil dilation response to the emotion associated pupil dilation response. Upon detecting the emotion, the authentication component 120 can alert the financial institution or system 100 of the emotion. The financial institution or system 100 can implement a personalized customer service response tailored to the detected emotion as an attempt to serve the user's emotion before the user performs an action such as closing the account or a customer complaint.

In some embodiments, the authentication component 120 aggregates multiple pupil dilation responses associated with the same emotion from different people into a common predicted pupil dilation response for that emotion. The pupil dilation response can be used in a general feature to predict user emotions in a public setting. For example, the authentication component 120 compiles an anger pupil dilation response. The anger pupil dilation response can be used at secured places, such as airports or banks. In some embodiments, high resolution cameras can scan the pupils of the people at the place and detect if someone is angry (or nervous or about to commit a crime) and alert the correct authorities to the angry person. In other embodiments, the secured place can utilize an image board displaying an array of challenge prompts and having video cameras to scan the pupil dilation responses to determine emotions of people in the public.

Figure 2:
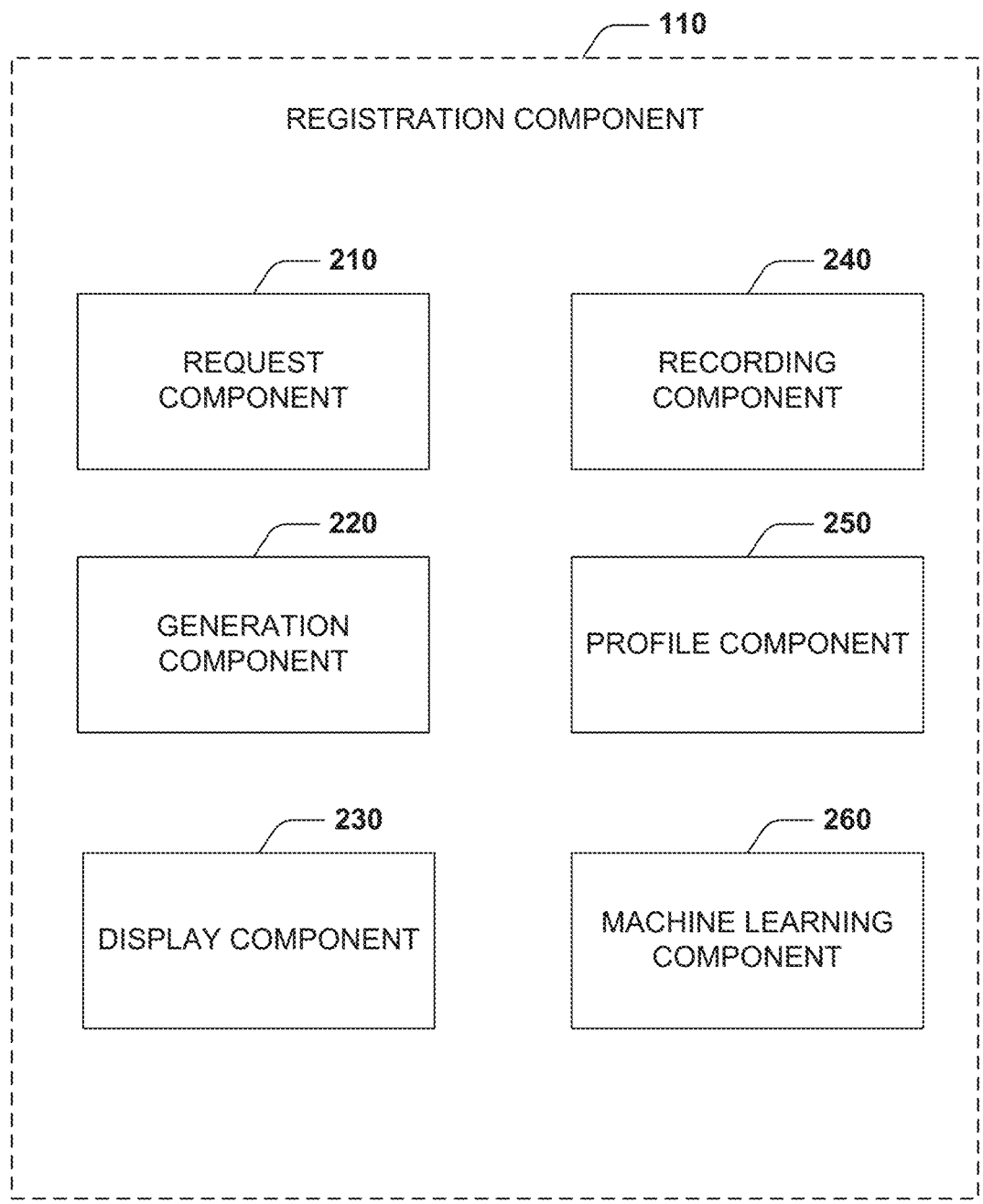
FIG. 2 illustrates an example component diagram of a registration component.

FIG. 2 illustrates a detailed component diagram of the registration component 110. The registration component 110 includes a request component 210. The request component 210 receives a registration request from a user or a person assisting the user with registration such as a bank teller, customer service representative, and/or the like. In some embodiments, the request component 210 can be connected to the internet, mobile network, local area network, remote servers, and/or the like to receive requests from remote locations. In other embodiments, the request component 210 and/or the registration component is connected to or a part of a financial system/network belonging to a financial institution.

The registration component 110 includes a generation component 220. The generation component 220 generates a challenge prompt in response to the registration request. The challenge prompt is a series of images, a video, and/or the like that is designed to cause a pupil dilation response from the user when viewed by the user. In some embodiments, the generation component 220 can generate a randomized challenge prompt. In other embodiments, the generation component 220 can select from a set of pre-generated challenge prompts. In other embodiments, the generation component 220 receives a selection of a challenge prompt from the user. The generation component 220 can generate a challenge prompt that includes changes in resolution, color, brightness, focus, and/or the like to cause different pupil dilation responses from the user.

The registration component 110 includes a display component 230 that displays the challenge prompt to the user such that the user can provide a pupil dilation response when viewing the challenge prompt on the display component 230. In some embodiments, the display component 230 can be a liquid crystal display, plasma, light emitting diode display, cathode based display, and/or the like.

The registration component 110 includes a recording component 240 that records a pupil dilation response of the user viewing the challenge prompt. The recording component 240 can collect a video of the pupil dilation response. In some embodiments, the recording component 240 can collect a series of images that coincide with the changes in the challenge prompt. In some embodiments, the recording component 240 is a video camera, still camera, burst shot camera, time lapse camera, and/or the like.

In some embodiments, the recording component 240 can detect a fail condition of the user. A fail condition can be detecting if a user looks away from the recording component 240, detects a blink or wink by the user, the space between the recording component 240 and the pupils are otherwise obstructed, and/or the like. The recording component 240 can determine the fail condition and have the display component 230 repeat displaying the challenge prompt.

The registration component 110 includes a profile component 250. The profile component 250 stores the pupil dilation response from the recording component 240. In some embodiments, the profile component 240 associates the pupil dilation response and the challenge prompt with the user, user account information, a new user profile, an existing user profile and/or the like.

The profile component 250 can build a pupil dilation profile of the user. The profile component 250 analyzes the pupil dilation response for the user's pupil changes such as magnitude of dilation, speed of dilation, pattern of dilation and/or the like. The pupil changes can be used for matching to subsequent pupil dilation responses during authentications. The analysis, the pupil dilation response, and/or the challenge prompt can be stored by the profile component 250 and associated with the user profile and/or account for future authentications. In some embodiments, the profile component 250 stores the pupil dilation response as an expected pupil dilation response to be used in future authentications.

In some embodiments, the registration component 110 includes a machine learning component 260. The machine learning component 260 can refine or adapt the expected pupil dilation response stored in the profile component 250. The machine learning component 260 can receive multiple pupil dilation responses of the user to the same challenge prompt and integrate pupil dilation response into the expected pupil dilation response on an ongoing basis. The expected pupil dilation response is refined by the machine learning component 260 to create a pupil dilation response that is more predictable for use in future authentications as anomalies are dampened over time. For example, a user profile includes an initial expected pupil dilation response. When the user provides a subsequent pupil dilation response during an authentication (described in detail below), the machine learning component 260 integrates the subsequent pupil dilation response into the expected pupil dilation response to refine the expected pupil dilation response.

Figure 3:
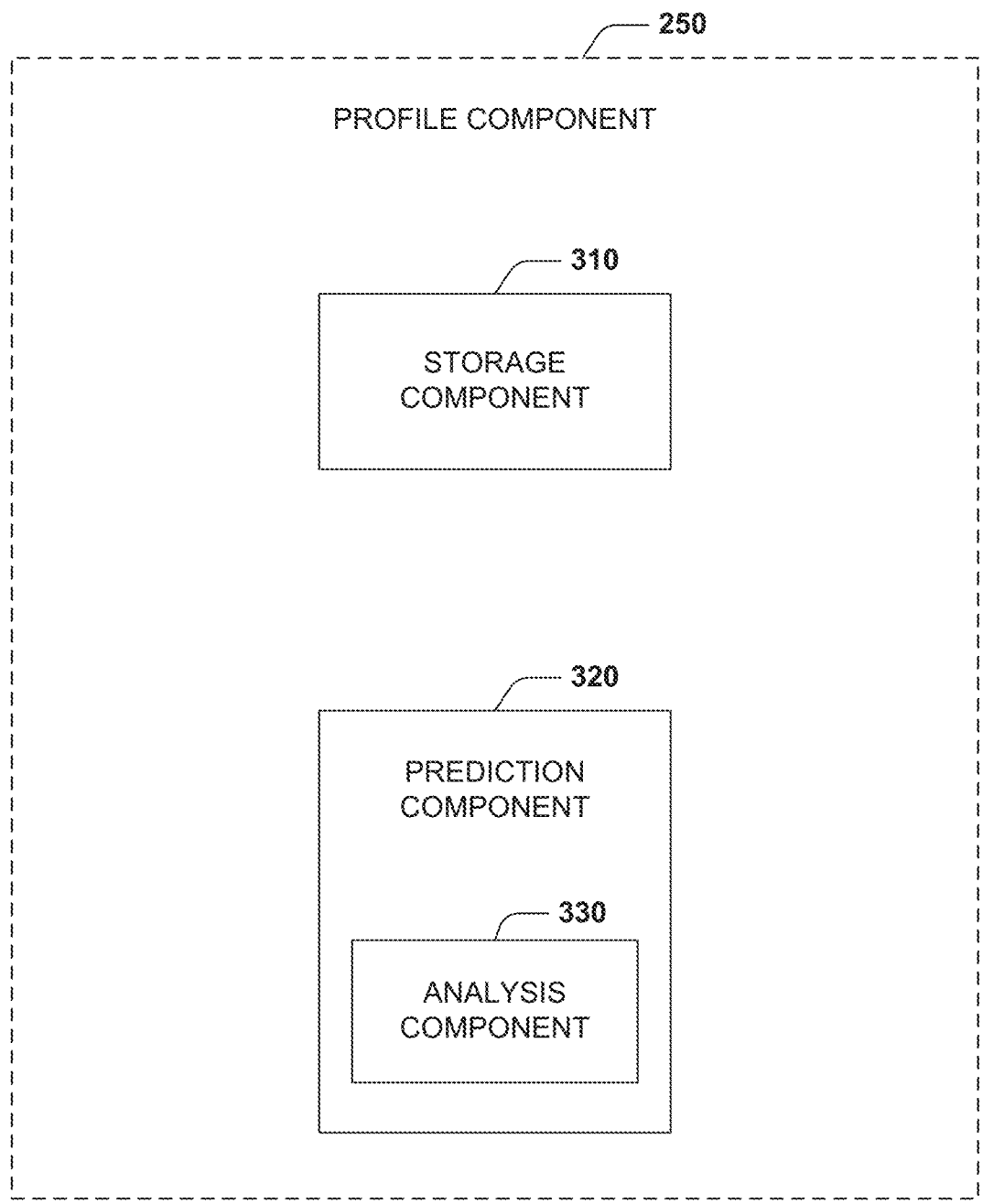
FIG. 3 illustrates an example component diagram of a profile component.

FIG. 3 illustrates a detailed component diagram of a profile component 250. The profile component 250 includes a storage component 310. The storage component 310 stores the user profile(s) including the user identification, user information, expected pupil dilation response, challenge prompt, and/or the like. The storage component 310 can be cloud storage, server, hard disk drive, solid state drive, memory, and/or the like.

The profile component 250 includes a prediction component 320 that generates an expected pupil dilation response. The expected pupil dilation response is the pupil dilation response that is used to compare to a provided pupil dilation response for authentication. The prediction component 320 can aggregate multiple pupil dilation responses from the same user viewing the same challenge prompt to generate the expected pupil dilation response.

The prediction component 320 includes an analysis component 330 that analyzes factors of a pupil dilation response such that the factors can be aggregated into the expected pupil dilation response. The factors include magnitude of dilation, speed of dilation, pattern of dilation, and/or the like. The prediction component 320 can receive the analysis of each factor and aggregate them into stored factors of the expected pupil dilation response.

For example, the expected pupil dilation response has a magnitude of dilation factor. A new pupil dilation response is received and analyzed to have a magnitude of dilation factor. The magnitudes can be averaged together to create an updated (or refined) expected pupil dilation response.

In some embodiments, the prediction component 320 tolls the number pupil dilation responses that are aggregated into the expected pupil dilation response to weight the pupil dilations responses into the expected pupil dilation response. In other embodiments, the prediction component 320 can use a "most recent" set of pupil dilation responses such that the expected pupil dilation response is an aggregate of a predetermined number of most recent pupil dilation responses.

Figure 4:
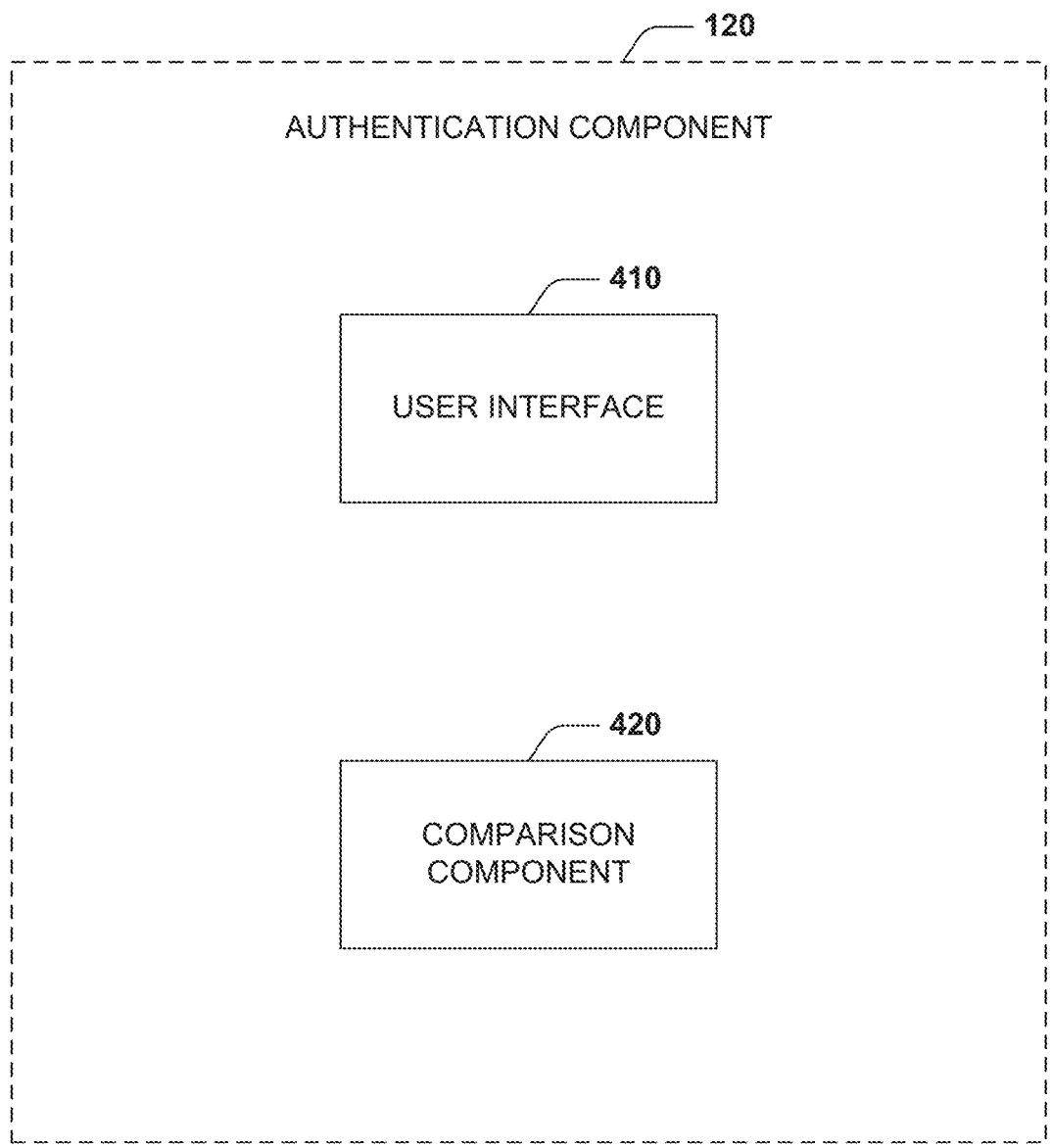
FIG. 4 illustrates an example component diagram of an authentication component.

FIG. 4 illustrates a component diagram of an authentication component 120. The authentication component 120 includes a user interface 410 that receives an authentication request from the user. The user provides the authentication request using the user interface 410. The authentication component 120 can access the user profile from the registration component 110 and/or the profile component 250. The authentication request can include user identification information such that the user profile can be accessed in the profile component 250.

The authentication component 120 and/or the user interface 410 receives the stored challenge prompt and the expected pupil dilation response from the profile component 250. In some embodiments, the user interface 410 displays the challenge prompt to the user to cause a pupil dilation response. In other embodiments, the authentication component 120 can request the registration component 110 and/or the generation component 220 to generate a second challenge prompt that will cause a similar pupil dilation response as the pupil dilation response associated with the user and stored with the registration component 110. In this specific embodiment, the generation component 220 can access the stored challenge prompt and generate a challenge prompt with the same changes in qualities (resolution, brightness, focus, and/or the like) and use a different series of images. This can provide an extra security feature for the user. In some embodiments, the authentication component 120 can generate a second challenge prompt. The user interface 410 displays the second challenge prompt to the user such that the user can provide a pupil dilation response.

The user interface 410 receives a pupil dilation response from the user. The user interface 410 can include a camera with which to capture the pupil dilation response for authentication. The camera can capture video, still images, burst shot images, time lapse images, and/or the like. In some embodiments, the camera can select the capture mode according to the stored challenge prompt.

In some embodiments, the user interface 410 can detect a fail condition of the user. A fail condition can be detecting if a user looks away, detects a blink or wink by the user, the space between the recording component 240 and the pupils are otherwise obstructed, and/or the like. The user interface 410 can determine the fail condition and repeat displaying the challenge prompt to the user.

The authentication component 120 includes a comparison component 420 that compares the pupil dilation response to the expected pupil dilation response. If the two pupil dilation responses match, the authentication component 120 authenticates the user as the user associated with the user profile. If they do not match, the user is not authenticated. In some embodiments, the comparison component 420 includes an error factor when comparing the pupil dilation responses. In some embodiments, the authentication component 120 can correct for time of day, glasses, distance, ambient light, alcohol influence, and/or the like. The authentication component 120 can infer an inebriated state based on time of day or geolocation (e.g. Friday afternoon or detecting the user was at a bar) and apply error factors accordingly to better predict the pupil dilation response.

Figure 5:
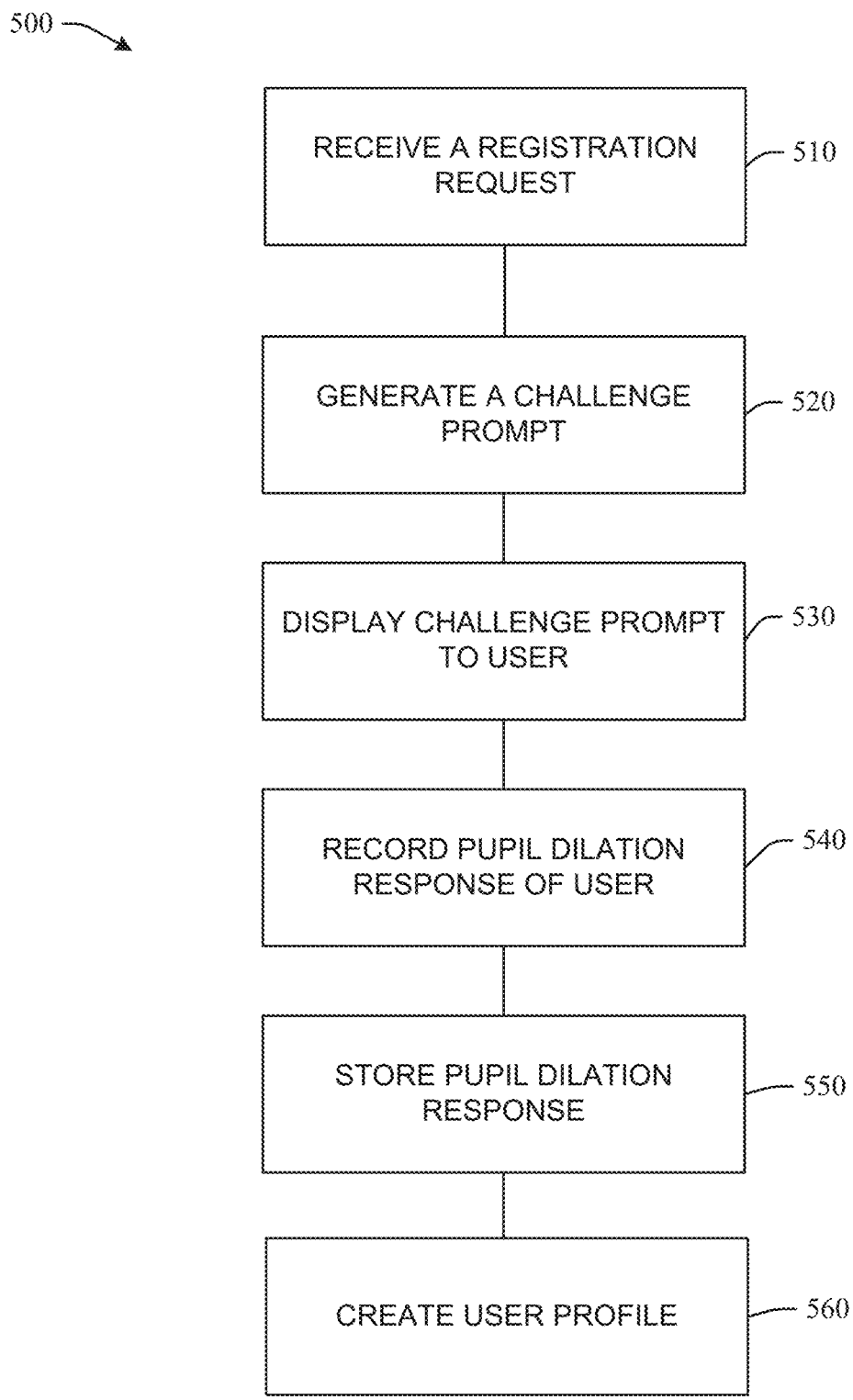
FIG. 5 illustrates a method for pupil dilation registration.
Figure 6:
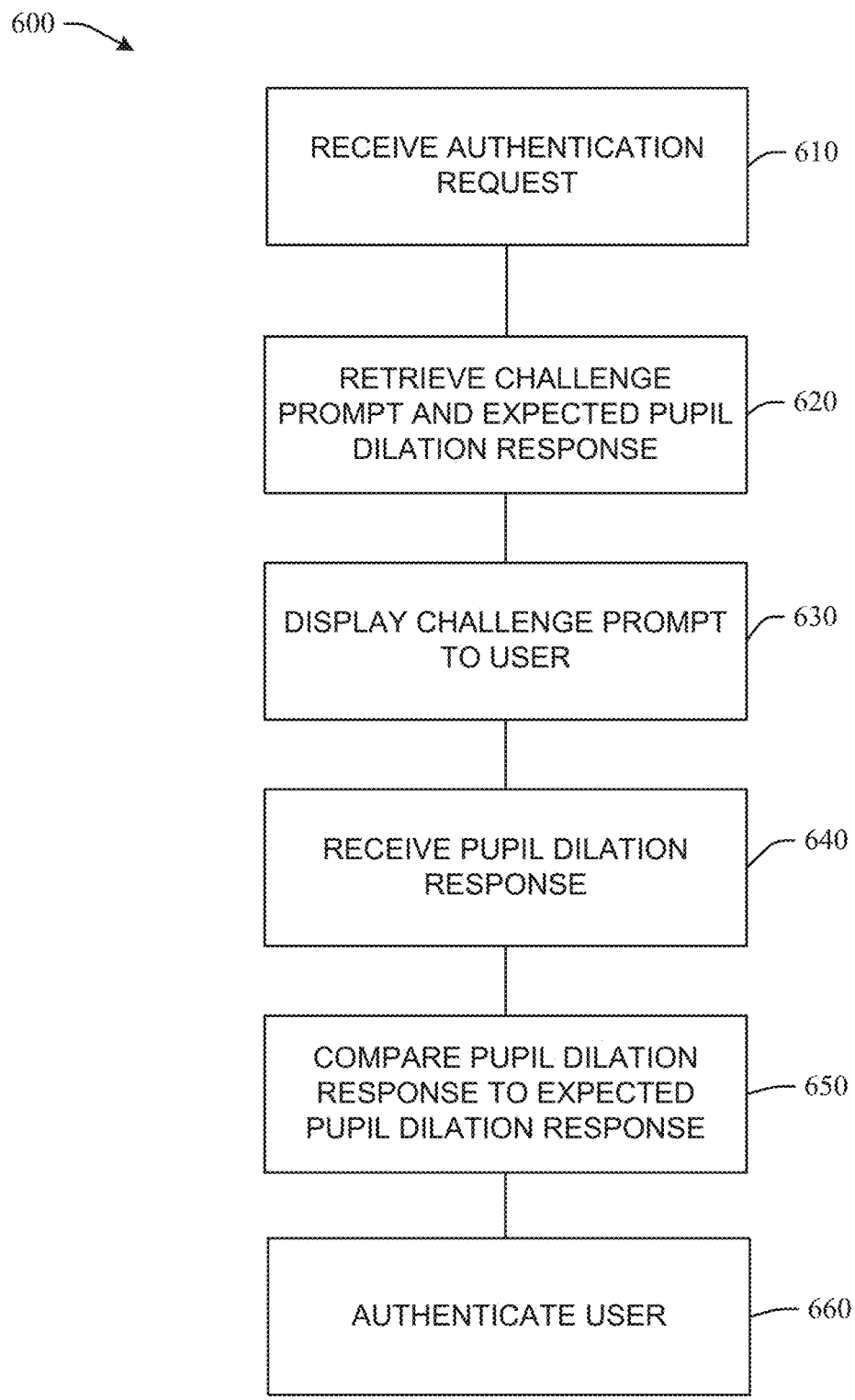
FIG. 6 illustrates a method for pupil dilation authentication.

With reference to FIGS. 5 and 6, example methods 500 and 600 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the methods 500 and 600 are described in conjunction with a specific example is for explanation purposes.

FIG. 5 illustrates a method 500 for registering a user for future authentication. The method 500 can begin at 510 by receiving a registration request. The registration request can include user identification, initial login credentials, a personal identification number, card number, account information, and/or the like. The user identification facilitates creating a user profile for pupil dilation authentication to authenticate the user in the future. At 520, a challenge prompt is generated for the user. The challenge prompt can be a series of images or a video designed to elicit a pupil dilation response in the user. The challenge prompt can vary in resolution, brightness, focus, color, and/or the like to cause certain pupil dilation responses while viewing the challenge prompt.

At 530, the challenge prompt is displayed to the user. At 540, a pupil dilation response of the user is recorded while the user is viewing the challenge prompt. The pupil dilation response is recorded using a still camera, video camera, or otherwise recording device to capture the pupil dilation response in the eyes of the user. At 550, the pupil dilation response is stored. At 560, the pupil dilation response, the challenge prompt, and the user identification/information are associated to one another and stored as a user profile to be used in authentications.

FIG. 6 illustrates a method 600 for pupil dilation authentication. At 610, an authentication request is received. The authentication request can include user identification, initial login credentials, a personal identification number, card number, account information, and/or the like. The user identification facilitates locating, receiving, and/or accessing a user profile for pupil dilation authentication to authenticate the user.

At 620, a challenge prompt and an expected pupil dilation response are retrieved. The challenge prompt and the expected pupil dilation response are associated with the user profile. The challenge prompt can be the same challenge prompt used during user registration or a different challenge prompt that will cause the same or similar pupil dilation response in the user. At 630, the challenge prompt is displayed to the user. At 640, a pupil dilation response is received by recoding the user viewing the challenge prompt. The pupil dilation response is recorded using a still camera, video camera, or other recording device to capture the pupil dilation response in the eyes of the user.

At 650, the pupil dilation response is compared to the expected pupil dilation response. If the pupil dilation responses match (or significantly match), at 660 the user is authenticated. If the pupil dilation responses do not match, the user is not authenticated.

Figure 7:
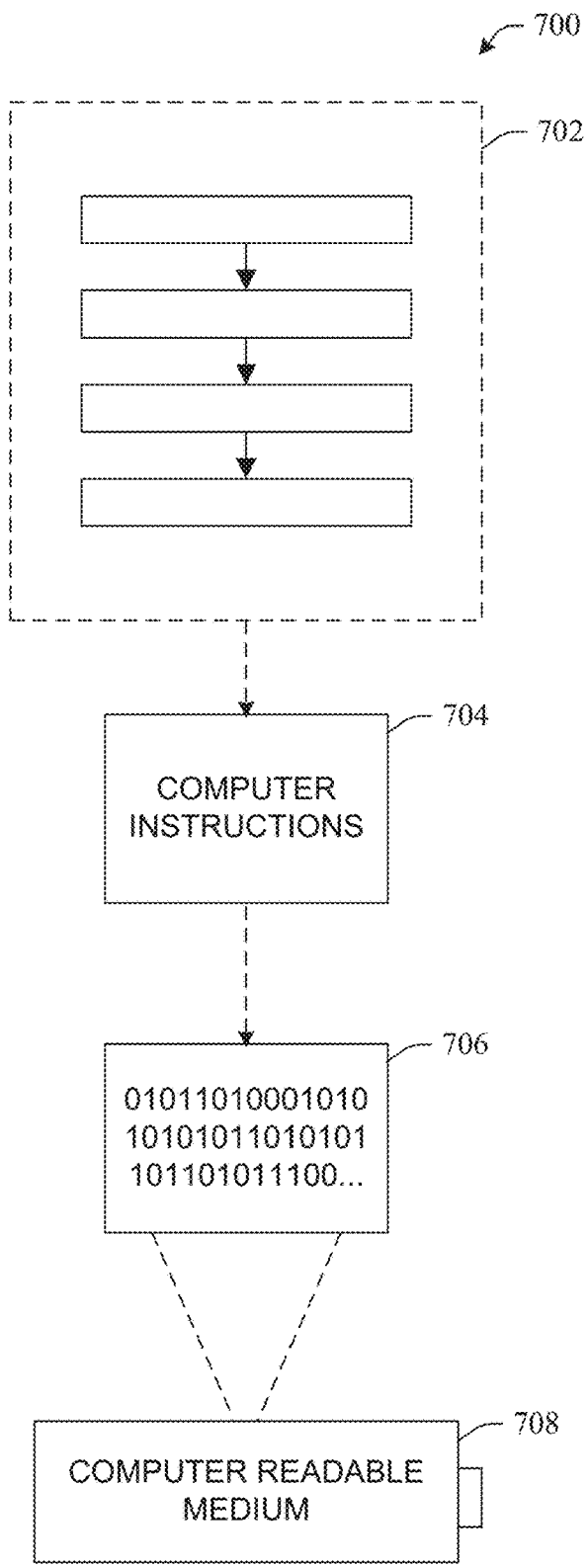
FIG. 7 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 7, wherein an implementation 700 comprises a computer-readable medium 708, such as a CD-R, DVD-R, flash drive, a platter of a hard disk drive, etc., on which is encoded computer-readable data 706. This computer-readable data 706, such as binary data comprising a plurality of zero's and one's as shown in 706, in turn comprises a set of computer instructions 704 configured to operate according to one or more of the principles set forth herein. In one such embodiment 700, the processor-executable computer instructions 704 is configured to perform a method 702, such as at least a portion of one or more of the methods described in connection with embodiments disclosed herein. In another embodiment, the processor-executable instructions 704 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 8:
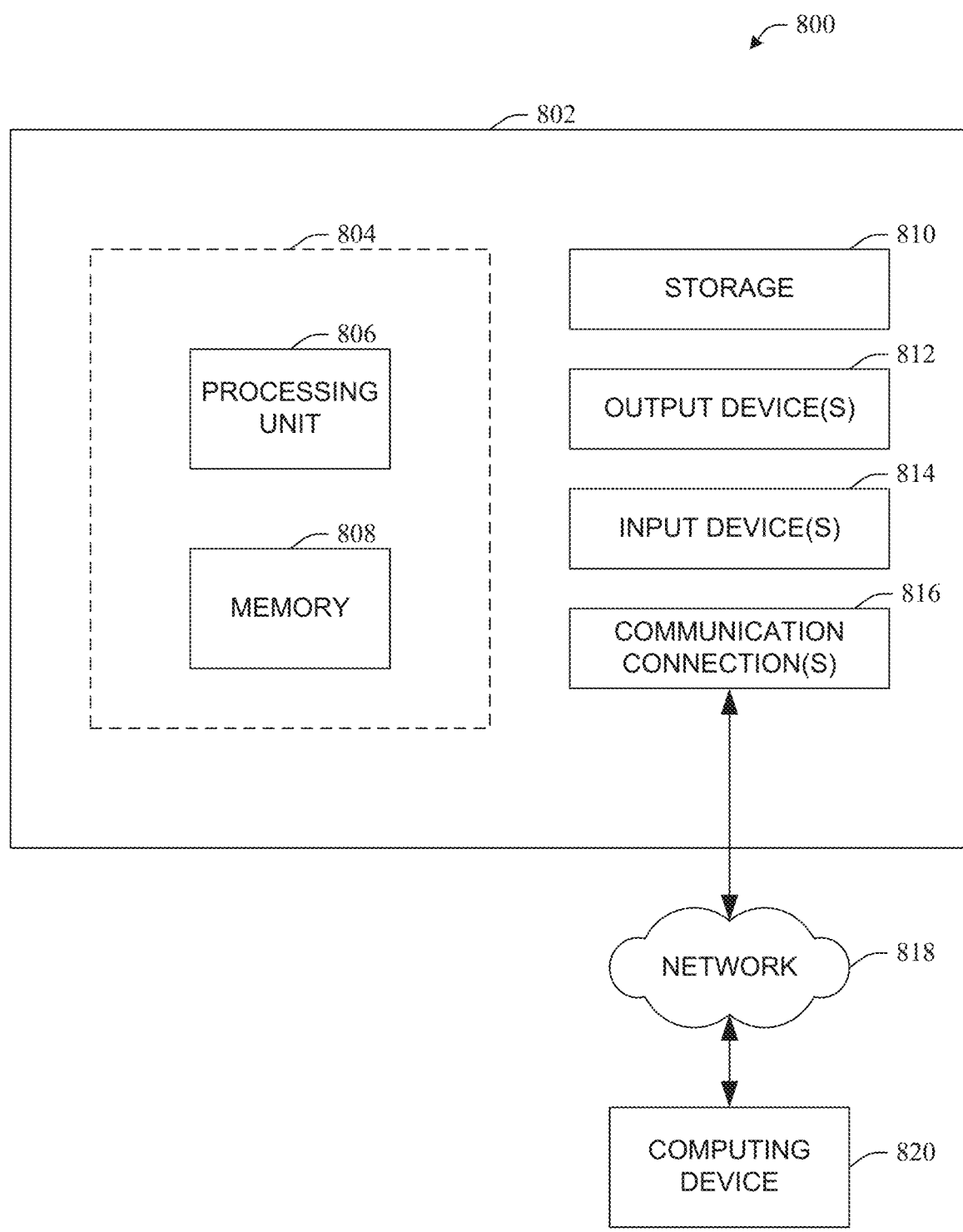
FIG. 8 illustrates a computing environment where one or more of the provisions set forth herein can be implemented, according to some embodiments.

With reference to FIG. 8 and the following discussion provide a description of a suitable computing environment in which embodiments of one or more of the provisions set forth herein can be implemented. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 8 illustrates a system 800 comprising a computing device 802 configured to implement one or more embodiments provided herein. In one configuration, computing device 802 can include at least one processing unit 806 and memory 808. Depending on the exact configuration and type of computing device, memory 808 may be volatile, such as RAM, non-volatile, such as ROM, flash memory, etc., or some combination of the two. This configuration is illustrated in FIG. 8 by dashed line 804.

In these or other embodiments, device 802 can include additional features or functionality. For example, device 802 can also include additional storage such as removable storage or non-removable storage, including, but not limited to, magnetic storage, optical storage, and the like. Such additional storage is illustrated in FIG. 8 by storage 810. In some embodiments, computer readable instructions to implement one or more embodiments provided herein are in storage 810. Storage 810 can also store other computer readable instructions to implement an operating system, an application program, and the like. Computer readable instructions can be accessed in memory 808 for execution by processing unit 806, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media can be part of device 802.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 802 can include one or more input devices 814 such as keyboard, mouse, pen, voice input device, touch input device, infrared cameras, video input devices, or any other input device. One or more output devices 812 such as one or more displays, speakers, printers, or any other output device can also be included in device 802. The one or more input devices 814 and/or one or more output devices 812 can be connected to device 802 via a wired connection, wireless connection, or any combination thereof. In some embodiments, one or more input devices or output devices from another computing device can be used as input device(s) 814 or output device(s) 812 for computing device 802. Device 802 can also include one or more communication connections 816 that can facilitate communications with one or more other devices 820 by means of a communications network 818, which can be wired, wireless, or any combination thereof, and can include ad hoc networks, intranets, the Internet, or substantially any other communications network that can allow device 802 to communicate with at least one other computing device 820.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

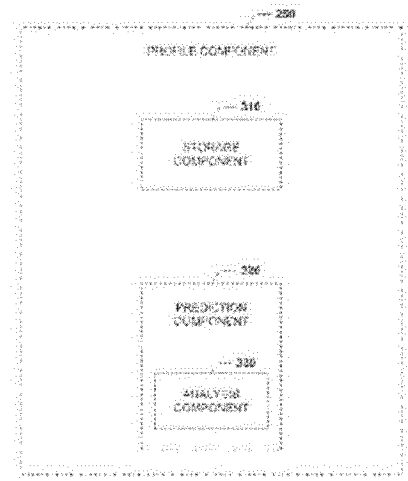

What is claimed is:

1. A method, comprising:
conveying, for display on a display device, a challenge prompt to a first user, wherein the challenge prompt comprises one or more images that cause a first pupil dilation response;
capturing the first pupil dilation response of the first user;
monitoring at least one user action of the first user;
determining an emotion based on the at least one user action;
associating the emotion with the first pupil dilation response;
comparing the first pupil dilation response to an expected pupil dilation response; and
authenticating the first user when the first pupil dilation response matches the expected pupil dilation response within a predetermined threshold.

2. The method of claim 1, further comprising:
sending an alert based on the emotion.

3. The method of claim 1, further comprising:
capturing a second pupil dilation response from a second user;
comparing the second pupil dilation response to the first pupil dilation response; and
associating the emotion with the second pupil dilation response based on comparing the second pupil dilation response to the first pupil dilation response.

4. The method of claim 3, further comprising:
comparing the first pupil dilation response to the second pupil dilation response in terms of at least one of magnitude of dilation, speed of dilation, or pattern of dilation.

5. The method of claim 3, further comprising:
applying an error factor prior to the comparing, wherein the error factor corrects for at least one of time of day, distance, or ambient light.

6. The method of claim 3, further comprising:
aggregating the first pupil dilation response and the second pupil response into a common predicted pupil dilation response for the emotion.

7. The method of claim 6, further comprising:
capturing a third pupil dilation response from a third user;
comparing the third pupil dilation response to the common predicted pupil dilation response; and
associating the emotion with the third pupil dilation response based on comparing the third pupil dilation response to the common predicted pupil dilation response.

8. The method of claim 1, further comprising:
comparing the first pupil dilation response to the expected pupil dilation response in terms of at least one of magnitude of dilation, speed of dilation, or pattern of dilation.

9. The method of claim 1, further comprising:
computing the expected pupil dilation response as an aggregate of a predetermined number of prior pupil dilation responses.

10. A system, comprising:
a processor coupled to a memory that stores instructions that when executed by the processor cause the processor to:
convey, for display on a display device, a challenge prompt to a first user, wherein the challenge prompt comprises one or more images that cause a first pupil dilation response;
capture the first pupil dilation response of the first user;
monitor at least one user action of the first user;
determine an emotion based on the at least one user action;
associate the emotion with the first pupil dilation response;
compare the first pupil dilation response to an expected pupil dilation response; and
authenticate the first user when the first pupil dilation response matches the expected pupil dilation response within a predetermined threshold.

11. The system of claim 10, wherein the instructions further cause the processor to send an alert based on the emotion.

12. The system of claim 10, wherein the instructions further cause the processor to capture a second pupil dilation response from a second user; compare the second pupil dilation response to the first pupil dilation response; and associate the emotion with the second pupil dilation response based on the comparing the second pupil dilation response to the first pupil dilation response.

13. The system of claim 12, wherein the instructions further cause the processor to compare the first pupil dilation response to the second pupil dilation response in terms of at least one of magnitude of dilation, speed of dilation, or pattern of dilation.

14. The system of claim 12, wherein the instructions further cause the processor to applying an error factor prior to the comparing, wherein the error factor corrects for at least one of time of day, distance, or ambient light.

15. The system of claim 12, wherein the instructions further cause the processor to aggregate the first pupil dilation response and the second pupil response into a common predicted pupil dilation response for the emotion.

16. The system of claim 15, wherein the instructions further cause the processor to capture a third pupil dilation response from a third user; compare the third pupil dilation response to the common predicted pupil dilation response; and associate the emotion with the third pupil dilation response based on comparing the third pupil dilation response to the common predicted pupil dilation response.

17. The system of claim 10, wherein the instructions further cause the processor to compare the first pupil dilation response to an expected pupil dilation response; and authenticate the first user when the first pupil dilation response matches the expected pupil dilation response within a predetermined threshold.

18. A method, comprising:
executing, on a processor, instructions that cause the processor to perform operations comprising:
identifying a challenge prompt for a first user, wherein the challenge prompt comprises one or more images that cause a first pupil dilation response;
conveying, for display on a display device, the challenge prompt to the first user;

capturing the first pupil dilation response of the first user;
monitoring at least one user action of the first user;
determining an emotion based on the at least one user action;
associating the emotion with the first pupil dilation response;
comparing the first pupil dilation response to an expected pupil dilation response; and
authenticating the first user when the first pupil dilation response matches the expected pupil dilation response within a predetermined threshold.

\* \* \* \* \*

UNITED STATES PATENT AND TRADEMARK OFFICE
CERTIFICATE OF CORRECTION

| | |
|---|---|
| PATENT NO. | : 11,687,636 B1 |
| APPLICATION NO. | : 17/478401 |
| DATED | : June 27, 2023 |
| INVENTOR(S) | : Noah L. Hughes and John Ervin Eisenhauer |

It is certified that error appears in the above-identified patent and that said Letters Patent is hereby corrected as shown below:

On the Title Page

Please delete the Title page and insert the attached Title page showing the corrected number of claims.

In the Claims

Column 13, Line 13, insert -- 19. The method of claim 18, further comprising capturing a second pupil dilation response from a second user; comparing the second pupil dilation response to the first pupil dilation response; and associating the emotion with the second pupil dilation response based on comparing the second pupil dilation response to the first pupil dilation response. --.

Signed and Sealed this
First Day of October, 2024

Katherine Kelly Vidal
*Director of the United States Patent and Trademark Office*

(12) United States Patent
Hughes et al.

(10) Patent No.: US 11,687,636 B1
(45) Date of Patent: *Jun. 27, 2023

(54) PUPIL DILATION RESPONSE FOR AUTHENTICATION

(71) Applicant: WELLS FARGO BANK, N.A., San Francisco, CA (US)

(72) Inventors: Noah L. Hughes, Des Moines, IA (US); John Ervin Eisenhauer, Sandpoint, ID (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/478,401

(22) Filed: Sep. 17, 2021

Related U.S. Application Data

(63) Continuation of application No. 16/886,275, filed on May 28, 2020, now Pat. No. 11,138,305, which is a continuation of application No. 15/826,962, filed on Nov. 30, 2017, now Pat. No. 10,685,101.

(51) Int. Cl.
| | |
|---|---|
| *G06F 21/32* | (2013.01) |
| *G06F 21/36* | (2013.01) |
| *G06V 40/19* | (2022.01) |
| *G06V 40/50* | (2022.01) |
| *G06V 40/18* | (2022.01) |

(52) U.S. Cl.
CPC .......... *G06F 21/32* (2013.01); *G06F 21/36* (2013.01); *G06V 40/19* (2022.01); *G06V 40/193* (2022.01); *G06V 40/197* (2022.01); *G06V 40/50* (2022.01)

(58) Field of Classification Search
CPC ........ G06F 21/32; G06F 21/36; G06V 40/19; G06V 40/193; G06V 40/197; G06V 40/50
See application file for complete search history.

(56) References Cited

U.S. PATENT DOCUMENTS

| | | |
|---|---|---|
| 6,247,813 B1 | 6/2001 | Kim et al. |
| 7,614,745 B2 | 11/2009 | Waldorf et al. |
| | (Continued) | |

FOREIGN PATENT DOCUMENTS

| | | |
|---|---|---|
| WO | 2015122789 | 8/2015 |
| WO | 2016111875 | 7/2016 |
| WO | 2017078572 | 5/2017 |

OTHER PUBLICATIONS

Kumar et al., Comparison and Combination of Iris Matchers for Reliable Personal Authentication, Pattern Recognition, vol. 43, No. 3, Mar. 2010, pp. 1016-1026.

*Primary Examiner* — Abiy Getachew
(74) *Attorney, Agent, or Firm* — Kilpatrick Townsend & Stockton LLP

(57) ABSTRACT

A user's emotion can be determined based on pupil dilation response to a challenge prompt. In response to an authentication request, a registered challenge prompt and an expected pupil dilation response can be retrieved. The challenge prompt can include one or more images or a video designed to cause a pupil dilation response in a user. The challenge prompt is displayed to the user and the user's pupil dilation response is captured. At least one user action of the user is monitored and an emotion is determined based on the at least one user action. The emotion is associated with the pupil dilation response.

19 Claims, 8 Drawing Sheets